United States Patent
Singhal et al.

(10) Patent No.: US 11,424,990 B2
(45) Date of Patent: Aug. 23, 2022

(54) SYSTEM AND METHOD FOR TOPOLOGY CONSTRUCTION IN HYBRID CLOUD ENVIRONMENTS

(71) Applicant: VMWARE, INC., Palo Alto, CA (US)

(72) Inventors: Ravi Singhal, Pune (IN); Prahalad Deshpande, Pune (IN); Avinash Nigam, Pune (IN); Abhijit Sharma, Pune (IN); Somil Bhandari, Pune (IN); Amarjit Gupta, Pune (IN); Ambarish Pande, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/939,141

(22) Filed: Jul. 27, 2020

(65) Prior Publication Data
US 2021/0367851 A1   Nov. 25, 2021

(30) Foreign Application Priority Data
May 21, 2020   (IN) .............................. 202041021373

(51) Int. Cl.
| | | |
|---|---|---|
| *H04L 12/24* | (2006.01) | |
| *H04L 29/08* | (2006.01) | |
| *G06F 3/00* | (2006.01) | |
| *H04L 41/12* | (2022.01) | |
| *H04L 61/5038* | (2022.01) | |

(52) U.S. Cl.
CPC .......... *H04L 41/12* (2013.01); *H04L 61/2038* (2013.01)

(58) Field of Classification Search
CPC ............................. H04L 41/12; H04L 61/2038
See application file for complete search history.

(56) References Cited

U.S. PATENT DOCUMENTS

| | | | | |
|---|---|---|---|---|
| 7,272,643 | B1 * | 9/2007 | Sarkar ................. | H04L 12/4641 709/228 |
| 7,752,024 | B2 * | 7/2010 | Ball ........................ | H04L 41/12 709/225 |
| 8,082,337 | B1 * | 12/2011 | Davis .................. | H04L 41/0893 726/1 |
| 8,145,788 | B1 * | 3/2012 | Love .................... | H04L 61/2557 709/219 |
| 10,061,611 | B2 * | 8/2018 | Tarasuk-Levin .... | G06F 9/44505 |
| 10,212,195 | B2 * | 2/2019 | Maskalik ............ | H04L 65/1069 |
| 10,505,806 | B2 * | 12/2019 | Maskalik ............ | H04L 41/0806 |
| 10,735,270 | B1 * | 8/2020 | Whipple ................ | H04L 45/02 |

(Continued)

*Primary Examiner* — Kevin T Bates
*Assistant Examiner* — Golam Mahmud
(74) *Attorney, Agent, or Firm* — Loza & Loza, LLP

(57) ABSTRACT

A system and method for topology construction in hybrid cloud environments includes receiving connection information from a local perimeter edge router of a local network that has a known topology and receiving connection information from a remote perimeter edge router of a remote network that is provided by a cloud provider. The received local perimeter edge router connection information is associated with the received remote perimeter edge router connection information. The associated connection information is normalized to a generic model, the generic model representing connections having different link layer policies in a generic way and the normalized connection information is applied to a network topology of the local network and the remote network.

20 Claims, 9 Drawing Sheets

(56) References Cited

U.S. PATENT DOCUMENTS

| | | | |
|---|---|---|---|
| 2009/0116404 A1* | 5/2009 | Mahop | H04L 41/12 370/254 |
| 2009/0327902 A1* | 12/2009 | Bethune | H04L 41/12 370/254 |
| 2011/0040864 A1* | 2/2011 | Gray | H04L 41/5058 709/223 |
| 2012/0272249 A1* | 10/2012 | Beaty | G06F 9/5083 719/318 |
| 2015/0188949 A1* | 7/2015 | Mahaffey | H04W 12/37 726/1 |
| 2015/0257081 A1* | 9/2015 | Ramanujan | H04L 45/24 370/329 |
| 2016/0080221 A1* | 3/2016 | Ramachandran | H04L 12/4633 709/224 |
| 2016/0105321 A1* | 4/2016 | Thakkar | H04L 41/0853 709/220 |
| 2017/0214737 A1* | 7/2017 | Agarwal | H04L 69/326 |
| 2017/0214738 A1* | 7/2017 | Agarwal | H04L 47/125 |
| 2018/0255142 A1* | 9/2018 | Benantar | H04L 63/0272 |
| 2019/0238410 A1* | 8/2019 | Kang | H04L 41/0873 |
| 2019/0260654 A1* | 8/2019 | Toshniwal | H04L 43/08 |
| 2019/0268421 A1* | 8/2019 | Markuze | H04L 67/10 |
| 2020/0327371 A1* | 10/2020 | Sharma | H04L 67/34 |
| 2021/0029201 A1* | 1/2021 | Masurekar | H04L 67/28 |
| 2021/0311718 A1* | 10/2021 | Sinha | G06F 8/65 |
| 2021/0409303 A1* | 12/2021 | Pande | H04L 45/02 |

\* cited by examiner

SYSTEM AND METHOD FOR TOPOLOGY CONSTRUCTION IN HYBRID CLOUD ENVIRONMENTS

RELATED APPLICATIONS

Benefit is claimed under 35 U.S.C. 119(a)-(d) to Foreign Application Serial No. 202041021373 filed in India entitled "SYSTEM AND METHOD FOR TOPOLOGY CONSTRUCTION IN HYBRID CLOUD ENVIRONMENTS", on May 21, 2020, by VMware, Inc., which is herein incorporated in its entirety by reference for all purposes.

BACKGROUND

Models of network topology are often captured in networking environments and used for the purposes of troubleshooting, security monitoring and management, bandwidth utilization and network performance monitoring, inter alia. In a hybrid environment with on-premises and cloud resources, a deep level of visibility into the network topology allows administrators to address advanced use cases such as firewall rule recommendations, micro-segmentation and planning, topology troubleshooting and bandwidth monitoring.

As networks become more complex and heterogeneous, certain difficulties arise in the process of determining the topology. In a hybrid system, the cloud routing tables and network interface-based information are not fully exposed. Different isolation, bridging, routing and network translation mechanisms may be employed for any given flow. Different cloud vendors may use different connectivity mechanisms under different networking constructs which are also not fully exposed.

SUMMARY

A system and method for topology construction in hybrid cloud environments includes receiving connection information from a local perimeter edge router of a local network that has a known topology and receiving connection information from a remote perimeter edge router of a remote network that is provided by a cloud provider. The received local perimeter edge router connection information is associated with the received remote perimeter edge router connection information. The associated connection information is normalized to a generic model, the generic model representing connections having different link layer policies in a generic way and the normalized connection information is applied to a network topology of the local network and the remote network.

A non-transitory computer-readable storage medium contains program instructions for a method for determining a network topology, wherein execution of the program instructions by one or more processors of a computer causes the one or more processors to perform steps that include receiving connection information from a local perimeter edge router of a local network that has a known topology and receiving connection information from a remote perimeter edge router of a remote network that is provided by a cloud provider. The received local perimeter edge router connection information is associated with the received remote perimeter edge router connection information. The associated connection information is normalized to a generic model, the generic model representing connections having different link layer policies in a generic way and the normalized connection information is applied to a network topology of the local network and the remote network.

A system for determining a network topology in a hybrid cloud environment has a memory and at least one processor configured to receive connection information from a local perimeter edge router of a local network that has a known topology and to receive connection information from a remote perimeter edge router of a remote network that is provided by a cloud provider. The received local perimeter edge router connection information is associated with the received remote perimeter edge router connection information. The associated connection information is normalized to a generic model, the generic model representing connections having different link layer policies in a generic way and the normalized connection information is applied to a network topology of the local network and the remote network.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
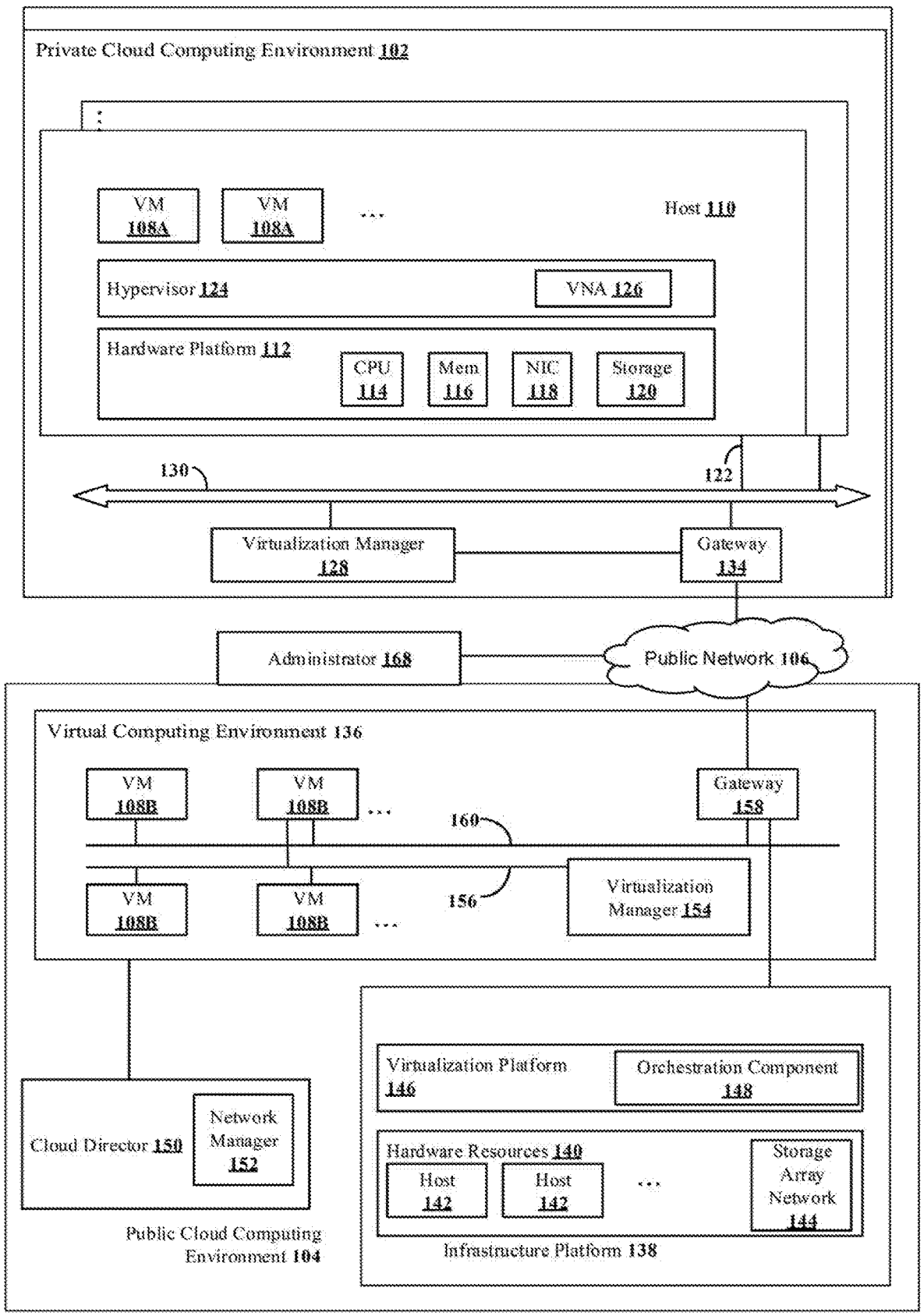
FIG. 1 is a block diagram of a hybrid cloud system suitable for an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Embodiments presented herein relate to systems and methods for network topology construction. In this specification, the terms "logical network entity," "logical network element," and the like will refer to software-defined networking (SDN) logical overlay network features. The terms, "virtual entities" and the like will refer to software-implemented networking services that reside in a distributed manner on a plurality of physical host computers and may handle logical overlay or physical underlay network traffic. In so doing, virtual entities, which include software-implemented switches, routers, tunnel endpoints, network filters/firewalls, etc., implement policies for the overlay software-defined network.

Turning now to FIG. 1, a block diagram of a hybrid cloud system in accordance with an embodiment of the invention is shown. The hybrid cloud system includes at least one private cloud computing environment 102 and at least one public cloud computing environment 104 that are connected via a public network 106, such as the Internet. The hybrid cloud system is configured to provide a common platform for managing and executing workloads seamlessly between the private and public cloud computing environments. In one embodiment, the private cloud computing environment may be controlled and administered by a particular enterprise or business organization, while the public cloud computing environment may be operated by a cloud computing service provider and exposed as a service available to account holders or tenants, such as the particular enterprise in addition to other enterprises. In some embodiments, the private cloud computing environment may comprise one or more on-premise data centers.

The private and public cloud computing environments 102 and 104 of the hybrid cloud system include computing and/or storage infrastructures to support a number of virtual computing instances 108A and 108B. As used herein, the term "virtual computing instance" refers to any software entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being VMs, although embodiments of the invention described herein are not limited to VMs.

The VMs 108A and 108B running in the private and public cloud computing environments 102 and 104, respectively, may be used to form virtual data centers using resources from both the private and public cloud computing environments. The VMs within a virtual data center can use private IP (Internet Protocol) addresses to communicate with each other since these communications are within the same virtual data center. However, in conventional cloud systems, VMs in different virtual data centers require at least one public IP address to communicate with external devices, i.e., devices external to the virtual data centers, via the public network. Thus, each virtual data center would typically need at least one public IP address for such communications.

Since public IP addresses are a limited resource, assigning at least one public IP address for each of the virtual data centers supported by a public cloud computing environment, which may be hundreds or thousands of virtual data centers, is not an efficient management of public IP addresses. In addition, since tenants of a public cloud computing environment may be charged for additional public IP addresses, there is a financial incentive to reduce the number of public IP addresses needed for virtual data centers of the public cloud tenants. As described in detail below, the hybrid cloud system employs an efficient routing technique using a virtual overlay network to manage public IP addresses used by the virtual data centers supported by the public cloud computing environment, which can conserve the number of public IP address used by the virtual data centers.

As shown in FIG. 1, the private cloud computing environment 102 of the hybrid cloud system includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions, for example, executable instructions that perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a physical network 122 within the private cloud computing environment 102. The physical network 122 may include physical hubs, physical switches and/or physical routers that interconnect the hosts 110 and other components in the private cloud computing environment 102. The network interface 118 may be one or more network adapters, such as a Network Interface Card (NIC). The storage system 120 represents local storage devices (e.g., one or more hard disks, flash memory modules, solid state disks and optical disks) and/or a storage interface that enables the host 110 to communicate with one or more network data storage systems. An example of a storage interface is a host bus adapter (HBA) that couples the host 110 to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host 110.

Each host 110 may be configured to provide a virtualization layer that abstracts processor, memory, storage and networking resources of the hardware platform 112 into the virtual computing instances, e.g., the VMs 108A, that run concurrently on the same host. The VMs run on top of a software interface layer, which is referred to herein as a hypervisor 124, that enables sharing of the hardware resources of the host by the VMs. One example of the hypervisor 124 that may be used in an embodiment described herein is a VMware ESXI™ hypervisor provided as part of the VMware vSphere® solution made commercially available from VMware, Inc. The hypervisor 124 may run on top of the operating system of the host or directly on hardware components of the host. For other types of virtual computing instances, the host 110 may include other virtualization software platforms to support those processing entities, such as the Docker virtualization platform to support software containers.

In the illustrated embodiment, the host 110 also includes a virtual network agent 126. The virtual network agent 126 operates with the hypervisor 124 to provide virtual networking capabilities, such as bridging, L3 routing, L2 Switching and firewall capabilities, so that software-defined networks or virtual networks can be created. The virtual network agent 126 may be part of a VMware NSX® virtual network product installed in the host 110. In a particular implementation, the virtual network agent 126 may be a virtual extensible local area network (VXLAN) endpoint device (VTEP) that operates to execute operations with respect to encapsulation and decapsulation of packets to support a VXLAN backed overlay network.

The private cloud computing environment 102 includes a virtualization manager 128 that communicates with the hosts 110 via a management network 130. In an embodiment, the virtualization manager 128 is a computer program that resides and executes in a computer system, such as one of the hosts 110, or in a virtual computing instance, such as one of the VMs 108A running on the hosts. One example of the virtualization manager 128 is the VMware vCenter Server® product made available from VMware, Inc. The virtualization manager 128 is configured to carry out administrative tasks for the private cloud computing environment 102, including managing the hosts 110, managing the VMs 108A running within each host, provisioning new VMs, migrating the VMs from one host to another host, and load balancing between the hosts.

The virtualization manager 128 is configured to control network traffic into the public network 106 via a gateway device 134, which may be implemented as a virtual appliance. The gateway device 134 is configured to provide the VMs 108A and other devices in the private cloud computing environment 102 with connectivity to external devices via the public network 106. The gateway device 134 serves as a perimeter edge router for the on-premises or co-located computing environment 102 and stores routing tables, network interface layer or link layer information and policies, such as IP security policies, for routing traffic between the on-premises and one or more remote computing environments.

The public cloud computing environment 104 of the hybrid cloud system is configured to dynamically provide enterprises (referred to herein as "tenants") with one or more virtual computing environments 136 in which administrators of the tenants may provision virtual computing instances, e.g., the VMs 108B, and install and execute various applications. The public cloud computing environment 104 includes an infrastructure platform 138 upon which the virtual computing environments 136 can be executed. In the particular embodiment of FIG. 1, the infrastructure platform 138 includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the VMs 108B across the hosts 142. The virtualization platform 146 may be implemented using one or more software programs that reside and execute in one or more computer systems, such as the hosts 142, or in one or more virtual computing instances, such as the VMs 108B, running on the hosts 142.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXI®-based hypervisor technologies provided by VMware, Inc. However, the virtualization platform may be implemented using any other virtualization technologies, including Xen®, Microsoft Hyper-V® and/or Docker virtualization technologies, depending on the processing entities being used in the public cloud computing environment 104.

In one embodiment, the public cloud computing environment 104 may include a cloud director 150 that manages allocation of virtual computing resources to different tenants. The cloud director 150 may be accessible to users via a REST (Representational State Transfer) API (Application Programming Interface) or any other client-server communication protocol. The cloud director 150 may authenticate connection attempts from the tenants using credentials issued by the cloud computing provider. The cloud director receives provisioning requests submitted (e.g., via REST API calls) and may propagate such requests to the orchestration component 148 to instantiate the requested VMs (e.g., the VMs 108B). One example of the cloud director 150 is the VMware vCloud Director® product from VMware, Inc.

In one embodiment, the cloud director 150 may include a network manager 152, which operates to manage and control virtual networks in the public cloud computing environment 104 and/or the private cloud computing environment 102. Virtual networks, also referred to as logical overlay networks, comprise logical network devices and connections that are then mapped to physical networking resources, such as physical network components, e.g., physical switches, physical hubs and physical routers, in a manner analogous to the manner in which other physical resources, such as compute and storage, are virtualized. In an embodiment, the network manager 152 has access to information regarding the physical network components in the public cloud computing environment 104 and/or the private cloud computing environment 102. With the physical network information, the network manager 152 may map the logical network configurations, e.g., logical switches, routers, and security devices to the physical network components that convey, route, and filter physical traffic in in the public cloud computing environment 104 and/or the private cloud computing environment 102. In one implementation, the network manager 152 is a VMware NSX® manager running on a physical computer, such as one of the hosts 142, or a virtual computing instance running on one of the hosts.

In one embodiment, at least some of the virtual computing environments 136 may be configured as virtual data centers. Each virtual computing environment includes one or more virtual computing instances, such as the VMs 108B, and one or more virtualization managers 154. The virtualization managers 154 may be similar to the virtualization manager 128 in the private cloud computing environment 102. One example of the virtualization manager 154 is the VMware vCenter Server® product made available from VMware, Inc. Each virtual computing environment may further include one or more virtual networks 156 used to communicate between the VMs 108B running in that environment and managed by at least one networking gateway device 158 as well as one or more isolated internal networks 160 not connected to the gateway device 158. The gateway device 158, which may be a virtual appliance, is configured to provide the VMs 108B and other components in the virtual computing environment 136 with connectivity to external devices, such as components in the private cloud computing environment 102 via the network 106.

The gateway device 158 operates in a similar manner as the gateway device 134 in the private cloud computing environment. The gateway device 158 operates as a remote perimeter edge router for the public cloud computing environment and stores routing tables, network interface layer or link layer information and policies such as IP security policies for routing traffic between the on-premises and one or more remote computing environments.

An administrator 168 is coupled to both of the edge routers 134, 158 and any other routers on the edge of either network through the public network 106 and is able to collect publicly exposed connection information such as routing configurations, routing tables, network interface layer information, local link layer information, policies, etc. The administrator is able to use this information to build a network topology for use in troubleshooting, visibility and administrative tasks. In some hybrid cloud scenarios, the information about vendor-specific communication mechanism constructs is not necessarily available via the public APIs that are exposed by cloud vendors.

A request to the public cloud edge router 158 may not reveal enough information to build a complete topology that can be used for administration and troubleshooting. With a diverse set of vendors, there are many different mechanisms by which the private cloud communicates with the public cloud, such as IPsec/L2 VPN (Virtual Private Network), Direct-Connect (AWS), ExpressRoute™ (Azure™), Google Interconnect (GCP), or SD-WAN (Software-Defined Networking in a WAN) (VeloCloud™ by VMware). These different connectivity mechanisms make it difficult to create a single network topology for the hybrid cloud. The administrator 168 combines the exposed information to build the network topology based in part on inferences.

The administrator 168 may collect and analyze routing configurations, routing tables and flow records in order to determine security policies, identify dependencies, migrate workloads, allocate resources, and the like. For example, the administrator 168 may be associated with a service provider (e.g., a provider of database services, streaming services, web services, or the like) that serves a plurality of endpoints in a hybrid networking environment. The hybrid networking environment may include non-unique IP addresses that may overlap with other IP addresses so it may be difficult to identify a source and destination workload of a flow record based on a source and destination IP address. This also limits visibility into traffic patterns and application dependencies that may be useful to build a network topology.

Techniques described herein, such as identification of administrative domains and their relationships, can also be applied to other networking-related problems like routing, reachability, and various types of analytics. While embodiments are described herein with respect to particular networking problems such as edge routing and subnets, other embodiments may be employed without departing from the scope of the present disclosure.

Furthermore, while certain techniques are described herein as involving the use of tables, it is understood that other types of data structures may be employed. Tables are merely included in this disclosure as one example, and any manner of storing associations among data may be used. For example, the routing information, the network interface information, and subnet identification tables may be implemented using a variety of types of data structures other than tables without departing from the scope of the present disclosure, such as hashes, vectors, stateless databases, databases, tree structures, etc.

Figure 2:
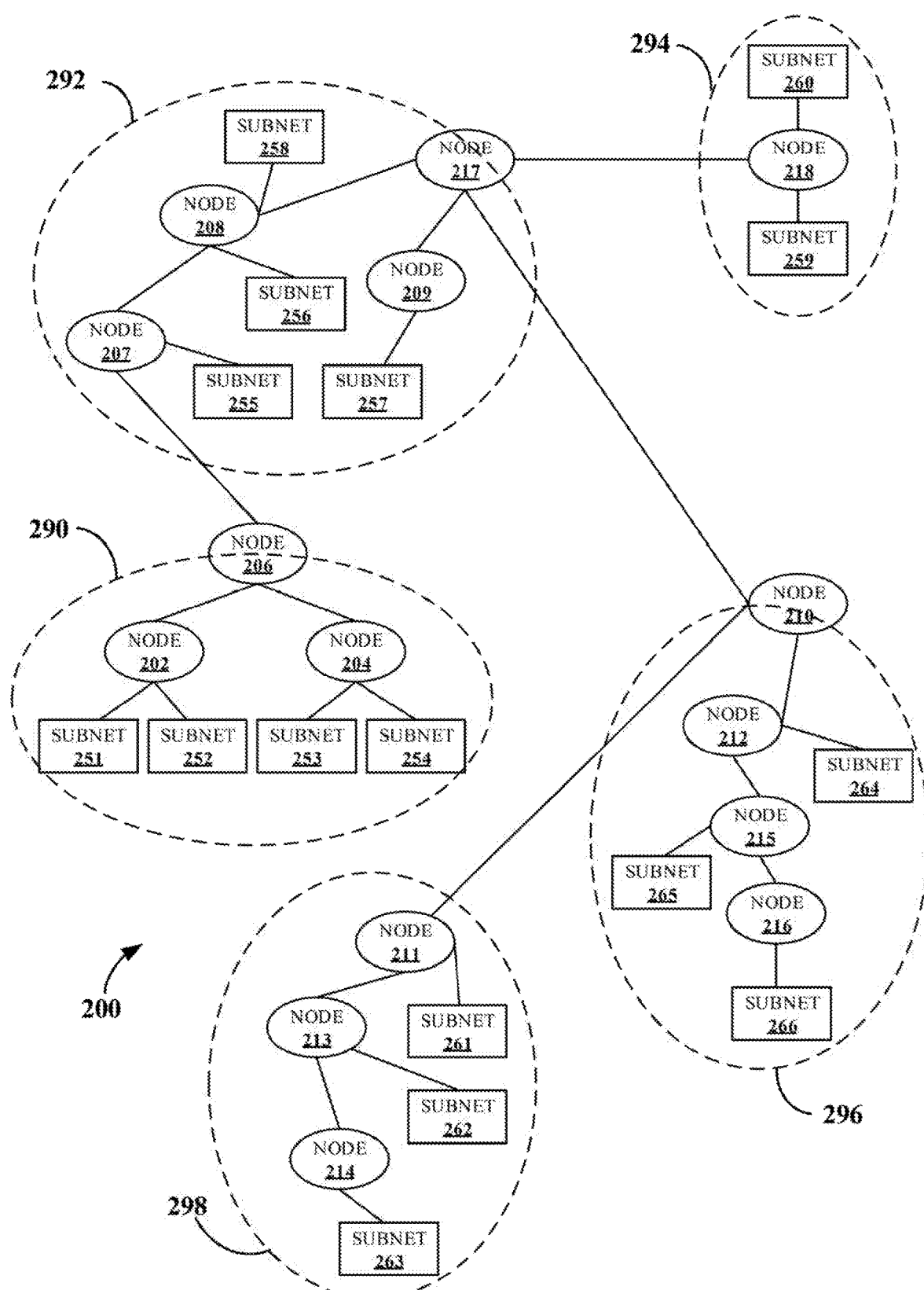
FIG. 2 is a diagram of connected networks with edge nodes and subnets suitable for an embodiment of the invention.

FIG. 2 illustrates an example of administrative domains 290, 292, 294, 296, 298 each housing subnets 251-266 within a network topology 200. The topology 200 includes a plurality of edge nodes 202, 204, 206, 207, 208, 209, 210, 211, 212, 213, 214, 215, 216, 217, and 218 at the perimeter of each administrative domain. The subnets (251-266) are connected to other administrative domains through the edge nodes. For example, each edge node may represent a gateway or perimeter router and each subnet may represent a group of IP addresses that are potentially reachable from the respective gateway. In some embodiments, the network topology 200 is generated based on network data (e.g., topology and routing data) received from endpoints such as the edge nodes.

Administrative domains 290, 292, 294, 296, and 298 may also be determined based on the topology and routing information. For example, each administrative domain may represent an isolated section of the network topology 200 that is hidden behind a direction of isolation rule. Each subnet within an administrative domain may be unique. Furthermore, each subnet reachable from an administrative domain may also be unique.

In some embodiments, workloads in a network environment are initially assigned to a global administrative domain. As operations continue, workloads are then moved from the global administrative domain to more specific administrative domains. Determining administrative domains may involve different steps for different types of networks. For example, in an environment involving NAT (Network Address Translation), NAT information may be included in the network data, and may be used in determining administrative domains. In an AWS (Amazon Web Services) environment, VPCs (Virtual Private Clouds) are created that include subnets. Each subnet within a VPC is unique, and any two VPCs can be peered if they do not include any overlapping subnets. As such, in an AWS environment, VPC and peer information may be used in determining administrative domains.

Other examples of determining administrative domains may include breaking a network environment into administrative domains such that each VNIC (Virtual Network Interface Controller) is in a separate administrative domain, choosing administrative domains such that all interfaces in a given L3 subnet are included in an administrative domain, and choosing administrative domains such that all subnets in a particular AWS VPC are included in a single administrative domain.

In one embodiment, the network topology 200 is modeled as a graph in which each node corresponds to an edge router and each edge router corresponds to a network link between corresponding edge routers. Where NAT rules apply, NAT direction properties are set for each applicable node, and nodes subject to NAT rules may be removed from the graph. A BFS (Breadth First Search) may then be performed in order to identify isolated sections (or "islands") in the graph. All of the nodes within an isolated section may then be grouped in an administrative domain (e.g., 290, 292, 294, 296, and 298).

A network topology for a hybrid cloud environment may be built using the edge routers of each network or domain. These edge routers serve as the endpoints of the connections. Their routing information may be collected as the advertised routes for connected other routers. In a BGP (Border Gateway Protocol) peering environment routes will be advertised to peer neighbor BGP nodes. As an example, a perimeter router, may send an advertised routes command to a BGP neighbor identified as 172.16.232.178. This may be done using, for example, "show ip bgp neighbors 172.16.232.178 advertised-routes." This is a command to show BGP and TCP connections to the indicated neighbor on all the routes that have been advertised to the indicated neighbor. Other similar commands may be used for other protocols and other configurations. The result returned may be similar to that shown below in Table 1, although this is simplified to show only two subnet entries in the Network column. The list of subnets in the Network column are the subnets that are advertised to the queried BGP neighbor and may therefore be the subnets of the perimeter router that sent the show command.

Table 2 shows example results from a received routes command, such as "show ip bgp neighbors 172.16.232.178 received routes." This is a command to show BGP and TCP connections to the indicated neighbor on all the routes that have been received by the indicated neighbor whether the route has been accepted or rejected. Other similar commands may be used for other protocols and other configurations. The list of local and remote subnets shown in the network column in this case are from the received routes from any other edge router.

TABLE 1

BGP Advertised Routes
BGP table version is 27, local router ID is 172.16.232.181 Status codes:
s suppressed, d damped, h history, * valid, > best, i-internal Origin
codes: i-IGP, e-EGP, ?-incomplete

| Network | Next Hop | Metric | LocPrf | Weight | Path |
|---|---|---|---|---|---|
| *>i10.0.0.0/24 | 172.16.232.179 | 0 | 100 | 0 | ? |
| *10.20.2.0/24 | 10.0.0.0 | 0 | | 32768 | i |

TABLE 2

BGP Received Routes
BGP table version is 27, local router ID is 172.16.232.181 Status codes:
s suppressed, d damped, h history, * valid, > best, i-internal Origin
codes: i-IGP, e-EGP, ?-incomplete

| Network | Next Hop | Metric | LocPrf | Weight | Path |
|---|---|---|---|---|---|
| *i172.16.1.0/24 | 172.16.232.181 | 0 | 100 | 100 | i |
| *172.17.1.0/24 | 192.168.2.2 | 300 | 32768 | 100 | 65502 i |

The information in the above tables may be combined to provide tables of IP addresses for various routes and to show all the subnet connections. These may be compiled to produce results such as Tables 3 and 4 below. Table 3 provides an example of information that may be obtained from two different example routing entities at the perimeter of a network. The first router is a perimeter edge router for an on-premises network such as the private cloud gateway router 134 of FIG. 1. The second router is a perimeter edge router for a cloud provider network, such as the public cloud gateway router 156 of FIG. 1. As shown, each routing entity has local and remote routing information for subnets within its network. This information may be compared to infer topology of the network. Table 4 shows similar example information for a system that uses BGP (Border Gateway Protocol) and ASN (Autonomous System Number) IDs such as a peering system with DX, ExpressRoute or Interconnect.

TABLE 3

Connectivity Mechanism: VPN

| Routing Entity | Connection Information | Applicable Subnets |
|---|---|---|
| On-premise Perimeter edge | Local Public IP Address - IP1<br>Remote Public IP Address - IP2<br>Local Id - ID1<br>Remote Id - ID2 | On-premise subnets behind the edge - S1, S2, S3 |
| Cloud provider perimeter edge | Local Public IP Address - IP2<br>Remote Public IP Address - IP1<br>Local Id - ID2<br>Remote Id - ID1 | Cloud subnets behind perimeter edge - CS1, CS2, CS3 |

TABLE 4

Connectivity Mechanism: DX/ExpressRoute/Interconnect

| Routing Entity | Connection Information | Applicable Subnets |
|---|---|---|
| On-premise Perimeter edge | Local BGP Identifier - BGPId1<br>Local ASN - ASN1<br>BGP Neighbor - BGPId2<br>BGP Neighbor ASN ASN2 | On-premise subnets behind the edge - S1, S2, S3 |
| Cloud provider perimeter edge | Local BGP Identifier - BGPId2<br>Local ASN - ASN2<br>BGP Neighbor - BGPId1<br>BGP Neighbor ASN - ASN1 | Cloud subnets behind perimeter edge - CS1, CS2, CS3 |

As shown in Tables 3 and 4, even though the information about vendor-specific communication mechanism constructs is not necessarily available via the public APIs exposed by cloud vendors and even though there are many different mechanisms for the private cloud to communicate with the public cloud, the terminating ends of the connection, the edge routers, still hold enough information to build the connection topology between the two. The network topology may still be inferred by applying certain heuristics on the configuration information that is available. As an example, in Table 3, a Local Public IP Address indicated as IP1 at the on-premise perimeter edge can be connected to the same address IP1 at the cloud provider perimeter edge to deduce a connection though the perimeters to a network node with this one address IP1. The Local ID (Identifier) ID1 at the on-premise perimeter edge in the same way can be inferred to be connected to the corresponding Remote ID, ID1 at the cloud provider perimeter edge. The node with address IP1 can then be linked to its related list of subnet S1, S2, or S3. The VPN connectivity includes information about the IP subnets to which the connection applies.

In the same way, address IP2 is available as a remote public IP address at the on-premise perimeter edge and also as a local public IP address at the cloud provider perimeter edge. Local ID ID2 at the cloud provider perimeter edge can be connected to ID2 as the remote ID at the on-premise perimeter edge. A connection can be inferred and linked to the cloud subnets CS1, CS2, or CS3. These connections may be used to reliably deduce a network topology in a hybrid cloud environment even in the absence of routing information in sections of the network. While only two IP addresses and two ID's are shown, there may be many more in use in any actual perimeter edge node.

Table 3 relates to a VPN connection but a hybrid cloud environment may involve one or more other connectivity mechanisms that may be vendor-specific. Table 4 relates to other connectivity mechanisms that use BGP ASN. There are a variety of different such vendor-specific systems. In the first example, the on-premise perimeter edge connects with a node that has a local BGP ID of 1 (BGPId1) and a local ASN of 1 (ASN1). It can then be inferred that this connects at the cloud perimeter edge to the BGP Neighbor node with BGPId1 and BGP Neighbor ASN of ASN 1. As with the VPN example of Table 3 the subnet information is also available for this connection.

Similarly, the BGP Neighbor node with BGPId2 and ASN2 at the on-premise perimeter edge is connected to the local node at the cloud provider perimeter edge with the same BGPId of 2 and ASN of 2. The cloud subnets CS1, CS2, and CS3 and local subnets S1, S2, S3 are also revealed in these tables with their connectivity information. Accordingly, the terminating ends (on-premise perimeter edge and cloud provider perimeter edge) of the connection to e.g. BGPId1, ASN1 are used to build the connectivity topology between the on-premises network and the cloud provider network even without any routing information. This allows the hybrid connection information to be normalized to a common model that is generic to any particular vendor-specific information.

The operations may be considered as using the terminating ends of the connection to reliably build a connectivity topology between the two networking entities even in the absence of routing information. The generic model has a structure with particular common elements that are augmented with hooks to the vendor-specific information when references are desired. The model contains fields that are common to a particular type of connectivity mechanism (e.g. VPN, DX, ExpressRoute etc.) irrespective of the underlying vendor. The generic values for this field have references to the generic routing entity model. These generic values are linked to references to an extension entity that stores any vendor specific information or metrics for that connection mechanism. The generic field values also are also linked to a local BGP (Border Gateway Protocol) peering configuration entity if BGP information is available. The local BGP peering configuration entity stores a reference to the peer BGP configuration entity and each BGP peering configuration entity stores a reference to the corresponding parent routing entity.

Although there is a general schema in the form of the generic model, the generic model has facilities to distinguish between the types of connectivity mechanisms. Accordingly, it is possible to distinguish a Policy-Based VPN connectivity mechanism within the model from a Route-Based VPN connectivity mechanism. This is done using the links to additional information, referred to as extension entities to store the vendor-specific information. The vendor specific extension entities are created when the generic entity for the connectivity mechanism is created as the network topology is generated. Once the hybrid cloud environment network topology is built, it can be used to derive a trace path between two workloads in the hybrid cloud as shown in the flow charts below.

Figure 3:
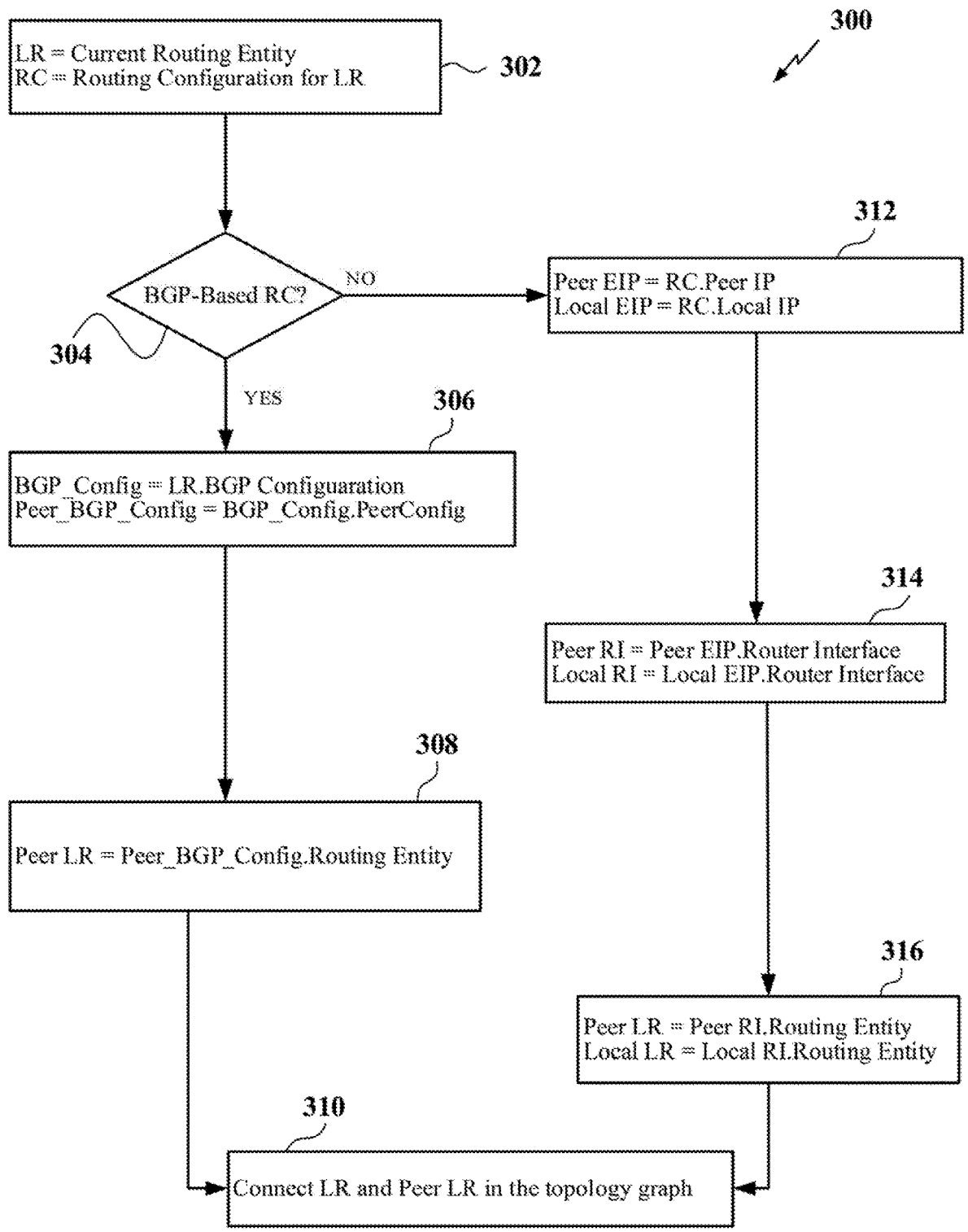
FIG. 3 is a process flow diagram of a method for determining routing entity relationships in a hybrid cloud environment in accordance with an embodiment of the invention.

FIG. 3 is a process flow diagram that illustrates example operations for connecting local and peer routing in a graph of a network topology. At block 302, LR and RC are defined as LR=Current Routing Entity, and RC=Routing Configuration for LR. Peer LR will be used to refer to the remote Peer LR, such as the cloud perimeter edge of Table 3, above. The routing configuration refers herein to a flat list of subnets or subnetworks. This list includes local and remote identifiers for a particular connectivity mechanism as shown, for example in Tables 3 and 4, that are received by the administrator from a routing entity. The local routing configuration is that of the on-premise routing entity. The remote routing configuration is that of the cloud provider of any type.

After the routing tables and network-interface layer information are collected from each known perimeter node, using for example, the show commands described above, then this information is analyzed for each node. The routing tables may include a flat list of subnets for each node. At block 304, the routing configuration is analyzed to determine if a VPN or peering type of connectivity mechanism is used. This can be represented as a choice between Table 3 and Table 4 above. The example operation is expressed as "BGP-based RC?"

If the routing configuration is based on BGP, then, at block 306, equivalents are declared or inferred for the values in the retrieved tables. These are stated as: 1) BGP_Config=LR.BGP Configuration and 2) Peer_BGP_Config=BGP_Config.PeerConfig. In other words, the values for the local and peer BGP configurations are determined based on values in the retrieved routing tables. At 308, the remote perimeter edge node routing information is determined using the peer BGP configuration. This is expressed as Peer LR=Peer_BGP_Config.Routing Entity.

With the configurations defined and compared, the connections are added to the graph of the network topology at block 310, which states Connect LR and Peer LR in the topology graph. This has been described with reference to Table 3 in which the addresses are matched to relate connections between matching addresses so that the on-premise and cloud provider perimeter edge are connected through the routing configurations.

When the local routing configuration is not based on BGP at block 304, then the process goes to block 312 at which external IP addresses are identified and defined: 1) Peer EIP=RC.Peer IP; and 2) Local EIP=RC.Local IP. In other words, the remote or peer external IP addresses are defined as the routing configurations for the peer IP addresses. Similarly, the local or on-premises external IP addresses are defined as the routing configurations for the local IP addresses.

At block 314, the router interfaces are defined using the retrieved routing configurations. In this case, the peer or remote router interface is defined using the external IP addresses. This is expressed as Peer RI=Peer EIP.Router Interface. Similarly, the local or on-premise router interface is defined using the local external IP addresses with a statement that Local RI=Local EIP.Router Interface.

With the addresses and interfaces defined at block 312 and block 314, at block 316, the routing entities are inferred so that the peer, remote, or cloud provider routing entity, depending on the structure of the hybrid topology, is determined. Similar to the BGP example, in this case the definition is stated as Peer LR=Peer RI.Routing Entity. These connections between routing entities have been made using the external IP addresses based on a VPN-type connectivity mechanism and can be added to the network topology at 310. As mentioned above, these additions to the network topology may be done including vendor-specific entity extensions.

Figure 4:
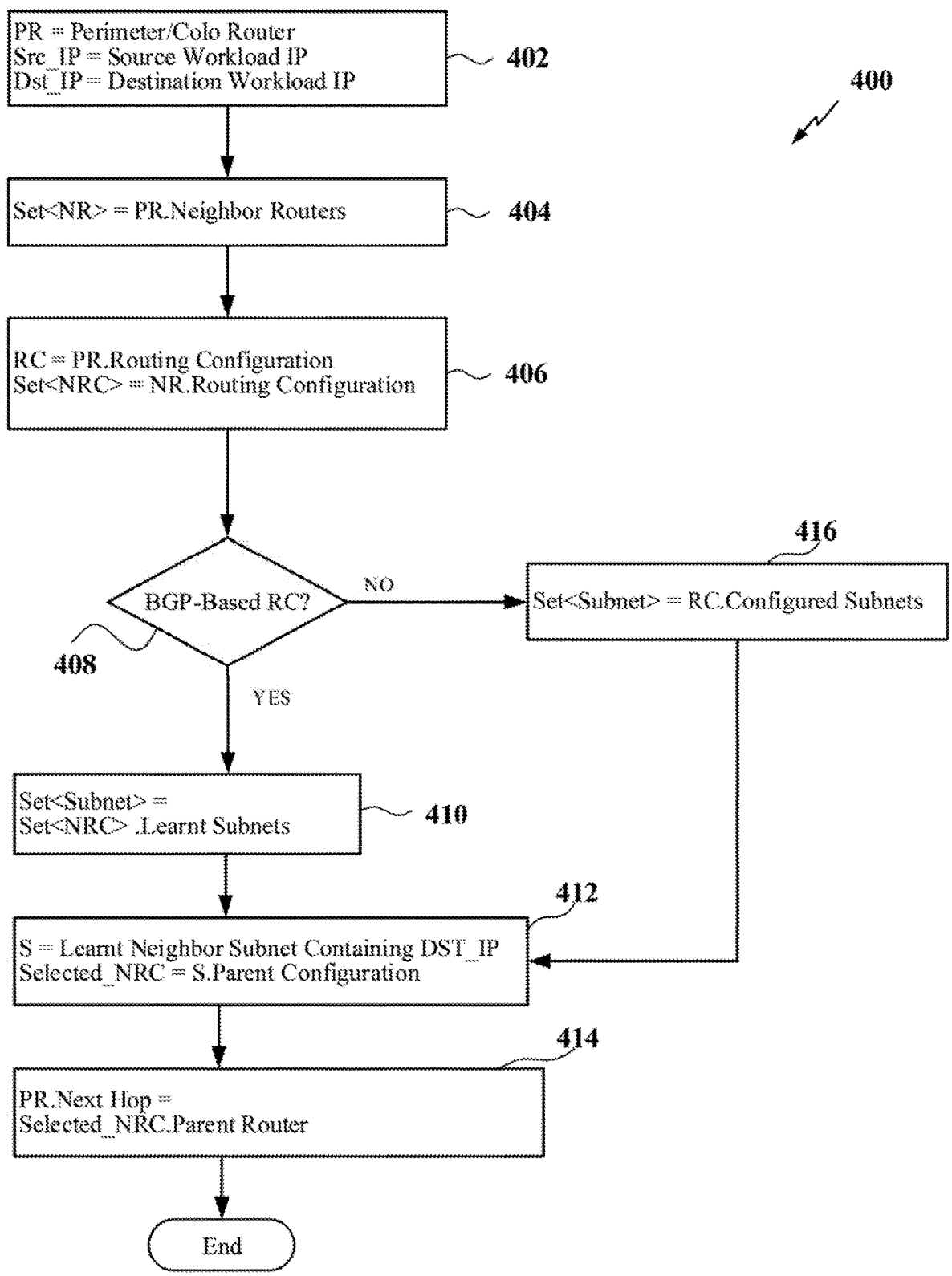
FIG. 4 is a process flow diagram of a method for deriving paths between workloads in a hybrid cloud environment in accordance with an embodiment of the invention.

FIG. 4 illustrates example operations for deriving paths in the hybrid cloud scenario using a path tracing command, such as tracepath or other path testing operations. The path tracing operation allows paths to be determined hop-by-hop, however, any other suitable operation may be used that reveals addresses and policies at steps in a sequence of hops. The operations begin at block 402 by defining PR= Perimeter/Colo Router. PR accordingly relates to the on-premise perimeter gateway router or node referred to above. In the described process, the co-located router for sending a traceroute may be the on-premises one. Also, at block 402, Src_IP=Source Workload IP, Dst_IP=Dest Workload IP. In this case, the path tracing operation is the workload and the operation starts with a source IP address (Src_IP) and a destination IP address (Dst_IP).

At block 404, NR is set to be the neighbor routers to the on-premises perimeter routers, e.g. Set<NR>=PR.Neighbor Routers. At block 406 RC is matched to the on-premises perimeter router routing configuration e.g. RC=PR.Routing Configuration. In addition, NRC is set to be the neighbor router routing configuration, e.g. set<NRC>=NR.Routing Configuration.

With the variables defined and terms established, the tracepath or similar operation is initiated. Any other type of tracing operation may be used, depending on the nature of the networks, protocols, and operating systems. When results come in for each hop in the path or route of the tracing packet, these results are analyzed individually. There are two paths in this analysis. This is similar to the two paths of analysis in FIG. 3. At block 408, the routing configuration is analyzed to determine if a VPN or peering type of connectivity mechanism is used. The example operation is expressed again as "BGP-based RC?"

For the BGP route the operations proceed to block 410 where the subnets are set to the list of subnets retrieved from the neighbor router configuration, i.e. the learnt subnets.

This is stated as: 1) Set<Subnet>= and 2) Set<NRC>.learnt subnets. On the other hand, for the non-BGP based configuration, such as a Policy Based VPN, as determined at 408, the operation at block 416 provides the neighbor subnets from the routing configuration itself. In this way either the routing table or the subnets received from the routing configuration are used to build the topology.

At block 412, the subnet results are analyzed so that the neighbor routing configuration is associated with the parent routing configuration of the neighbor subnet that contains the destination IP address for the hop. This reveals the subnet and a destination for the next hop. This analysis is presented as two statements. S=learnt neighbor subnet containing DST_IP. The definition for S is then applied in the second statement: Selected_NRC=S.Parent Routing Configuration. Accordingly, the routing configuration of the selected neighbor is associated with the subnet defined in the definition of S.

After the operation at block 412 is completed, then the next hop can be determined at block 414. In this case, the next hop for the perimeter router is the parent router for the S subnet. This statement is presented as PR.NextHop= Selected_NRC.Parent Router.

For the VPN path, the operations are simpler in that the subnet is determined based on the subnets that are configured in the router configuration. At block 416, this is stated as Set<Subnet>=RC.configured subnets. The operation at block 416 is then followed with the operation at block 412 as described above. The multiple path tracing commands are used in this way to derive the paths and discover the subnets based on the network topology. As new nodes and subnets are discovered, then the network topology is augmented with the new data.

Figure 5:
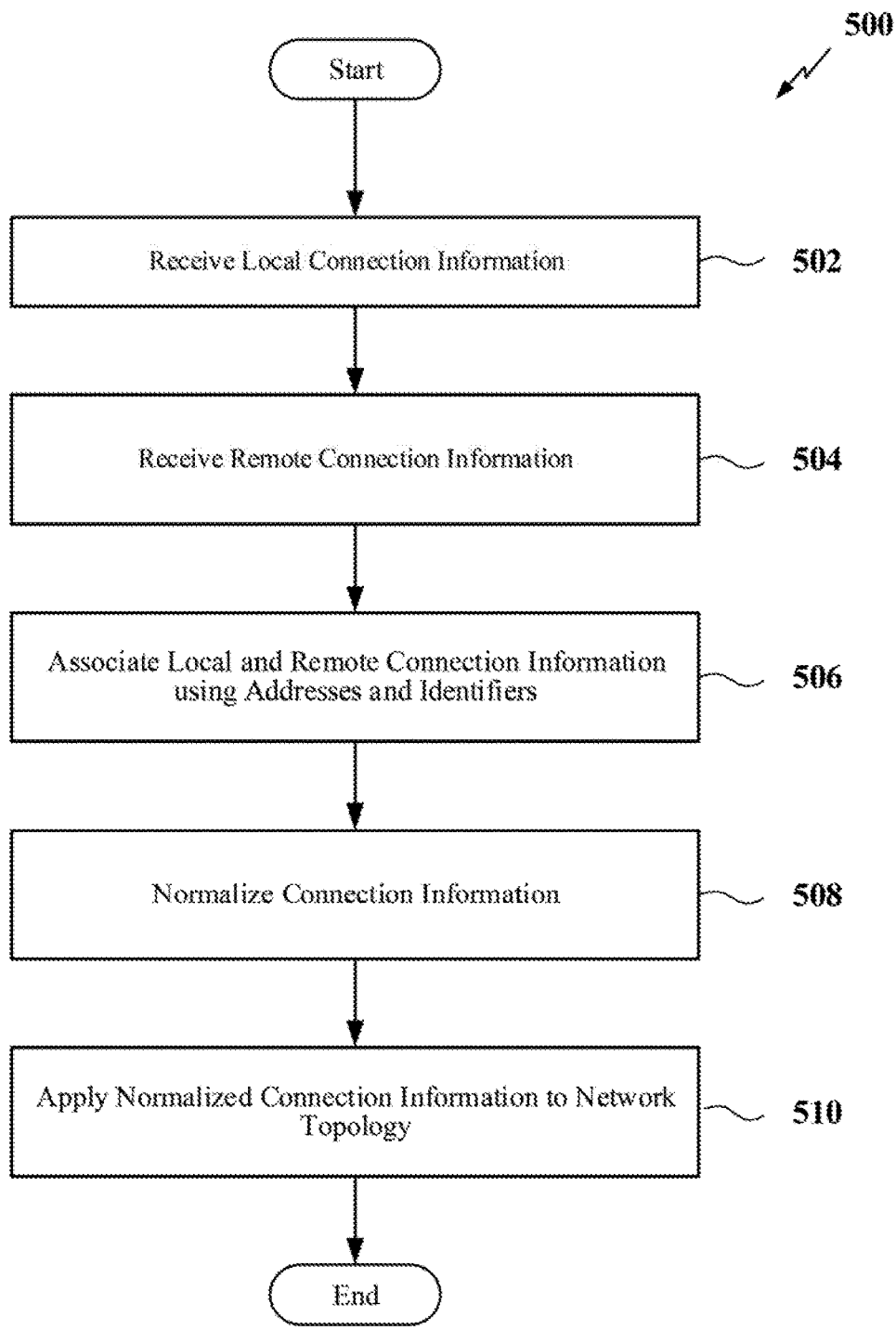
FIG. 5 is a process flow diagram of a method for building a network topology in accordance with an embodiment of the invention.

FIG. 5 is a process flow diagram for a method of generating a network topology in a hybrid topology as described above. At block 502, connection information is received from a remote perimeter edge router of a cloud network. The received local connection information may be local routing configurations and local link layer information. Similarly, at block 504, the received remote connection information may be remote routing configurations and remote link layer information. The information may be received by first issuing show commands to known routers as described above.

At block 506, the received local perimeter edge router connection information is associated with the received remote perimeter edge router connection information. Many of these associations may be made using addresses and identifiers in the connection information. For example, a local public address of the received local routing configuration may be associated with a corresponding remote public address of the received remote routing configuration. As another example, a remote public address of the received local routing configuration may be associated with a corresponding local public address of the received remote routing configuration. In these examples, a remote public address of the received remote routing configuration corresponds with the local public address of the received local routing configuration in that the remote public address and the local public address are the same address. In the case of BGP network or subnet, the local public addresses are local BGP identifiers and the remote public addresses are configured as BGP neighbor identifiers.

As with the addresses, identifiers may also be associated when they are the same identifier. A local ID (Identifier) of the received local routing configuration may be associated with a corresponding remote ID of the received remote routing configuration and a remote ID of the received local routing configuration may be associated with a corresponding local ID of the received remote routing configuration. Subnets may also be associated so that subnets of the received local routing configuration are associated with the associated local public address.

At block 508, the associated connection information is normalized to a generic model. The generic model is generic in that connections having different link layer policies are represented in a generic way. In an example, the information may be normalized by creating a generic entity and a vendor-specific entity for each connection.

The normalized connection information is applied at block 510 to the network topology the local network and the remote network. The normalized connection information may be applied in an example by connecting network entities together using an analysis of the generic model with the applied normalized connection information. The network topology shows the connections without regard to a particular vendor-specific mechanism.

In an example, the generic entity generated by the normalization operation is applied to the generic model and a reference to the vendor-specific entity is added to the generic model. The references may include hooks in the generic model for each of the different link layer policies of the connection information. The hooks may also be used for additional purposes. As an example, the hooks may represent additional vendor-specific information of each respective different link layer policy. The hooks within the generic model may be used for vendor-specific attributes of each vendor-specific entity.

As a further operation, paths may be derived between two routing entities of the network topology. The derived path may then be tested with a path tracing command, such as tracepath or a similar command. If a new routing entity is found in the path, then connection information for that routing entity may be requested. If that information is received then it may be added to the topology using the FIG. 5 process. If routing information is not received, then the new routing entity may still be included as being a part of the path.

Figure 6:
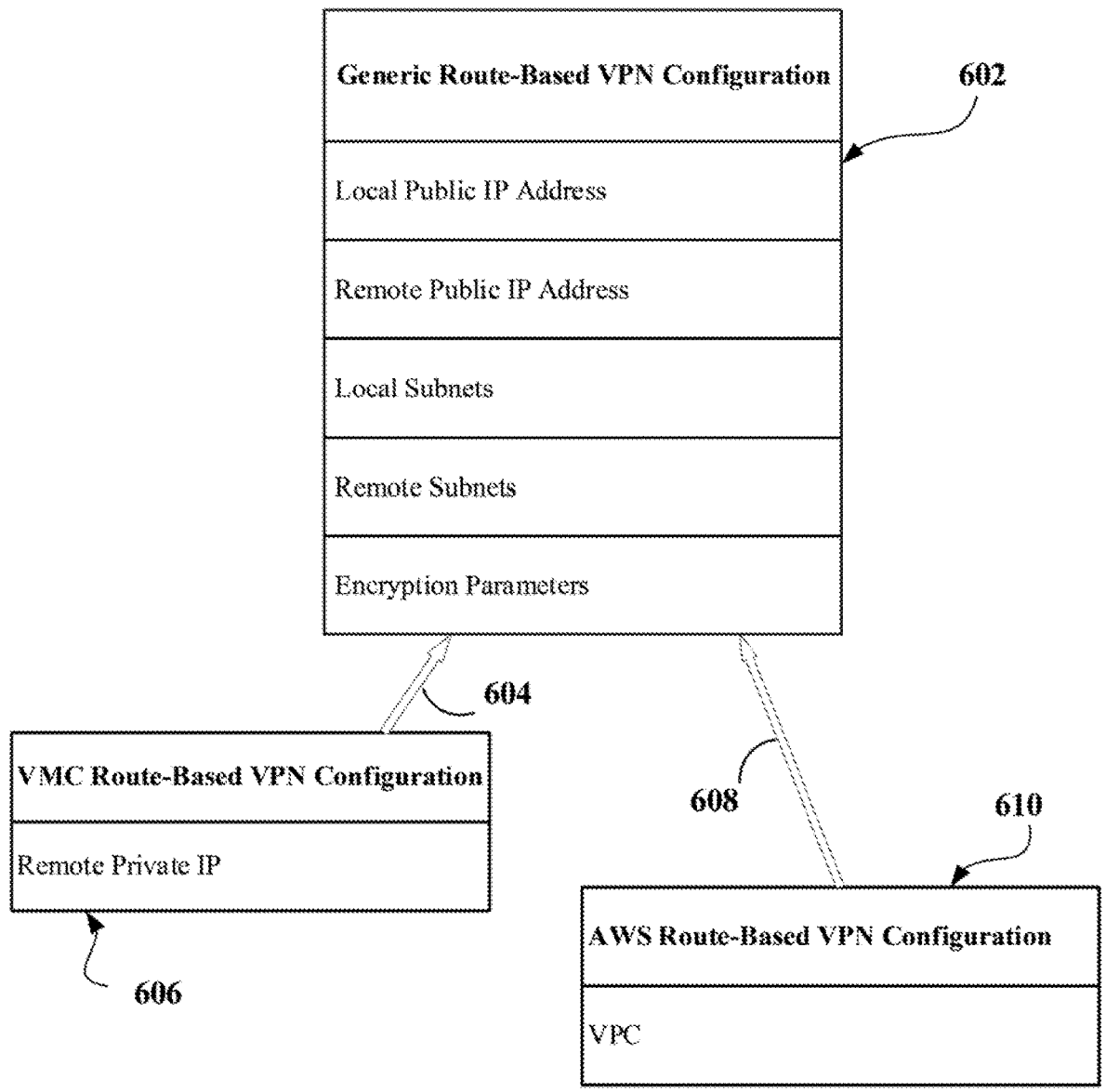
FIG. 6 is a diagram of generic route-based VPN configuration tables with extension entities in accordance with an embodiment of the invention.

FIG. 6 is a diagram of a table for a route-based part of a generic VPN configuration with hooks for extension entities. The top table 602 refers to the generic model and is titled Generic Route-Based VPN Configuration. This is a table for the generic configurations for this example route-based VPN. In this way it resembles Table 3 and may be generated using the same or similar information. It includes the local public IP address, the remote public IP address, the local subnets, the remote subnets and encryption parameters. These are all expressed in a generic form.

In addition to the generic table 602, there is a first hook 604, such as a reference, index, or pointer, to additional encryption parameters in a related table 606. This additional table has the remote private IP information for the vendor-specific node indicated in the generic table. In this case, the node has a VMC (VMware Cloud™) route-based VPN configuration. This refers to specific extensions to the generic VPN configuration models to accommodate a particular configuration of VMC on AWS. Similarly, another extension entity 610 is referenced by other hooks 608 to the encryption parameters. This one is labeled AWS Route-Based VPN Configuration and captures the VPC (Virtual Private Cloud) extensions for AWS in this hybrid topology. The generic model 602 allows for quick and ready administration while the extension entities 606, 610 provide the deeper insight required for more complex tasks.

Figure 7:
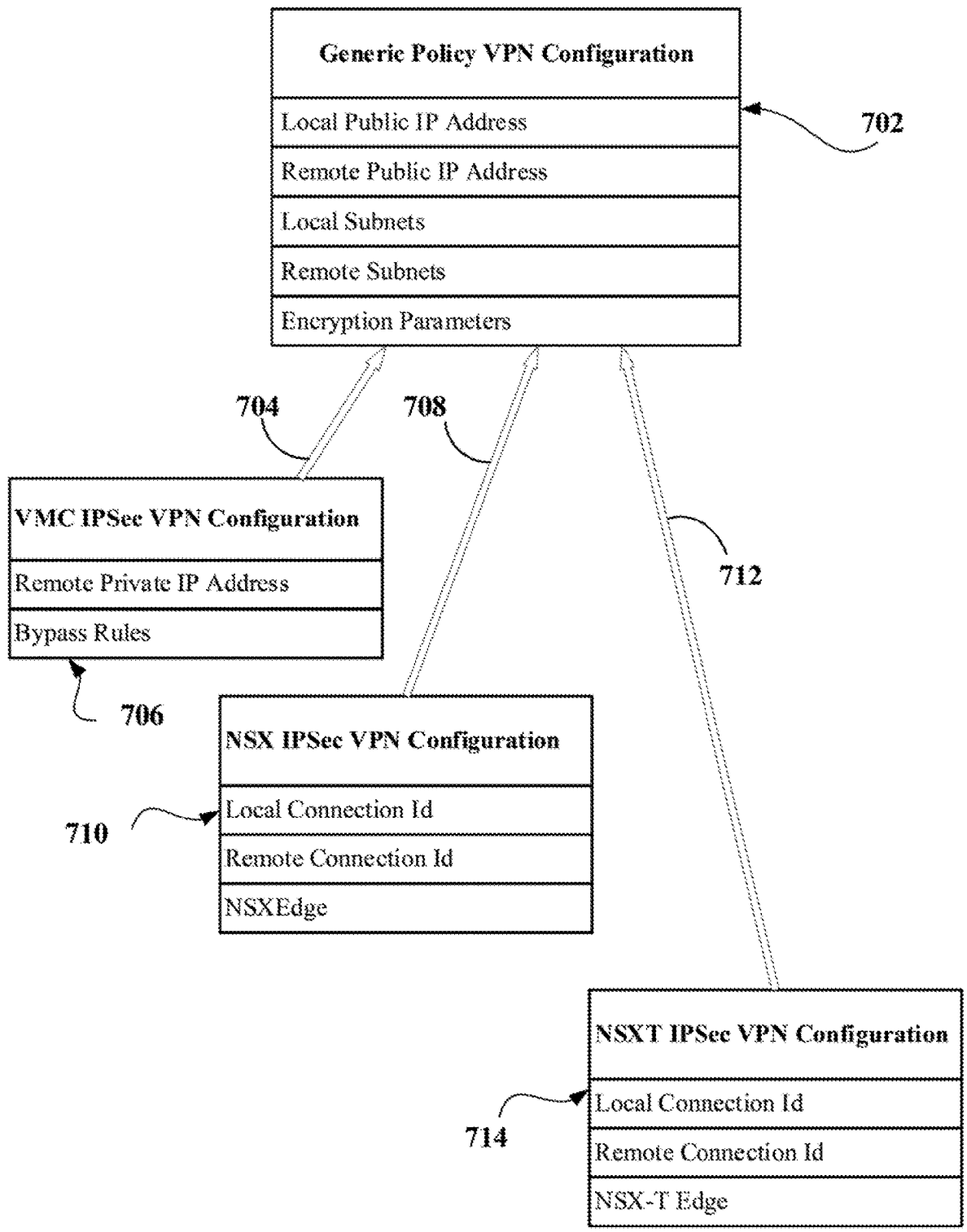
FIG. 7 is a diagram of generic policy VPN configuration tables with extension entities in accordance with an embodiment of the invention.

FIG. 7 is a diagram of a table for a policy part of a generic VPN configuration topology with extension entities for three different VPN configurations. Similarly, the top table 702 refers to the generic model and is titled Generic Policy VPN Configuration. It includes the local public IP address, the remote public IP address, the local subnets, the remote subnets and encryption parameters. These are all expressed in a generic form.

The first extension hook 704 connects to an extension entity in the form of a table with specific configuration extensions for a VMC IPsec VPN configuration with a remote private IP address and bypass rules. This extension entity is an example of information to support VMware Cloud™ using AWS policies. The second extension hook 708 connects to an extension entity 710 with specific configuration extensions for an NSX IPsec Network Virtualization VPN configuration. This has a local connection ID, a remote connection ID and NSX Edge policies. The third extension hook 712 connects to an extension entity 714 with specific configuration extensions for NSX-T IPsec Network Virtualization VPN configuration. The extension entities 706, 708, 714 allow for the complete specific configurations to be provided with direct access from the generic table 702. The extension entities shown in these examples are provided as examples and hooks may be provided for any other vendor-specific routing configuration or policy, depending on the configuration of the hybrid network.

Figure 8:
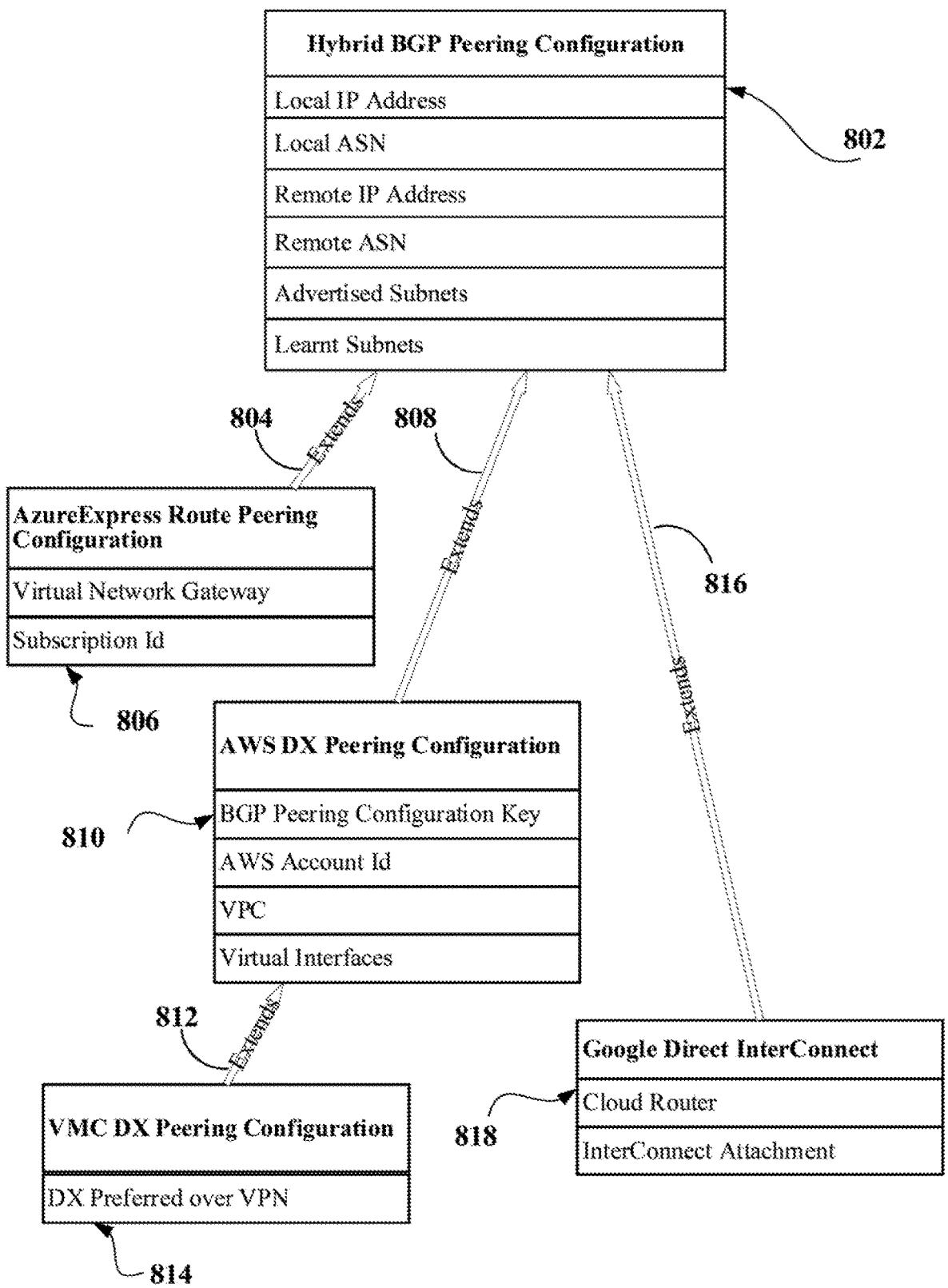
FIG. 8 is a diagram of hybrid BGP peering configuration tables with extension entities in accordance with an embodiment of the invention.

FIG. 8 is a diagram of a table for a peering configuration part of a generic hybrid BGP configuration topology. There are extension entities for three different vendor-specific configurations. The generic topology table 802 is titled Hybrid BGP Peering Configuration and it includes a local IP address, local ASN, remote IP address, remote ASN, advertised subnets and learnt subnets. This is very similar to the information of Table 4.

The first extension entity 806 is for an Azure™ Express-Route™ Peering configuration. This table includes the Azure™ specific extensions to the generic BGP peering configuration connected by a hook 804 to the generic model 802. Virtual Network Gateway, and Subscription ID are specific Azure™ constructs that are supplied using this extension entity 804.

Another hook 808 connects to a table 810 for an AWS DX peering configuration. This has the specific extensions to the generic BGP peering configuration that are required to support AWS DX, such as a BGP peering configuration key, an AWS account ID, a VPC, and virtual interfaces. In this example and as an example, there is a further hook 812 for special cases of vendor-specific configurations. This further extension entity 814 is a VMC DX peering configuration. This has specific extensions to a generic BGP peering configuration. In addition to the AWS specific constructs 810, there are also VMC specific settings 814 such as DX Preferred over VPN which plays an important role in topologies related to VMC.

A third extension entity 818 is connected by a third hook 816 to the generic BGP table 802. This one as an example is for Google Direct Inter Connect and has specific extensions to the generic BGP peering configuration to support Google cloud services. These include Cloud Router and Inter Connect Attachment. Additional or alternative extension entities may be used to suit different hybrid topologies. These are provided only as examples for VPN routing, security and BGP connections. For other types of connectivity mechanisms and for other vendors, other types of extension entities may be used.

As mentioned above subnets are also discovered from the received local and remote connection information. Using the discovered subnets, the network topology may be enhanced with a variety of additional tables that include subnets and administrative domains for those subnets. The lookup tables for each administrative domain may be populated based on the visibility of corresponding subnets. Each subnet that is potentially reachable from within an administrative domain is mapped to the administrative domain in which it is located.

Figure 9:
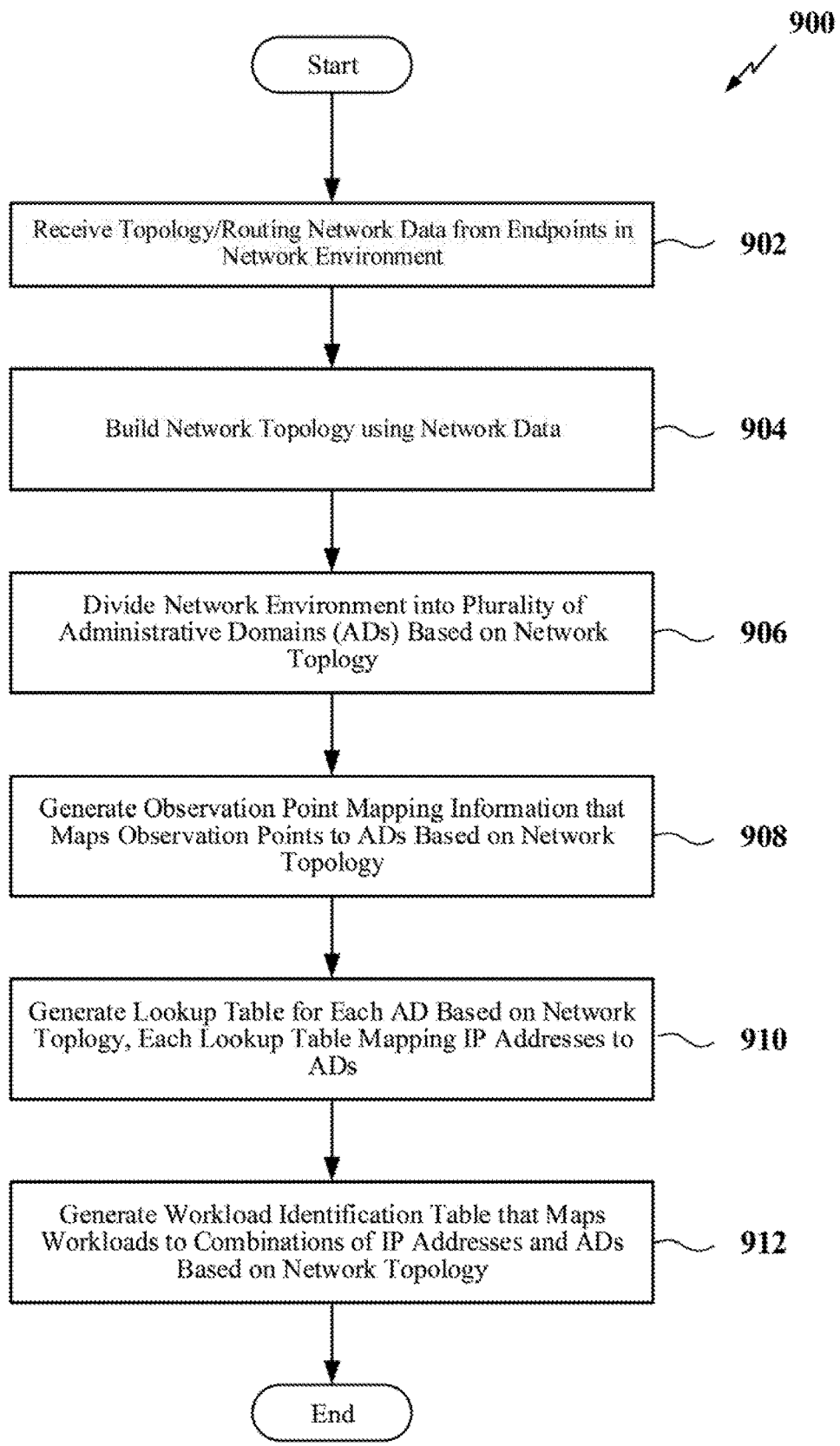
FIG. 9 is a process flow diagram of a method for workload identification in flow records through administrative domains in accordance with an embodiment of the invention.

FIG. 9 is a flow chart of a method 900 related to workload identification in flow records. Operations 900 may, for example, be implemented by management entity 168 of FIG. 1. At 902, topology and routing network data is received from endpoints in the network environment. For example, network data (e.g., inventory data) may be retrieved from routers, switches, gateways, firewalls, NAT entities, VPN entities, AWS (Amazon® web services) entities, and the like. The network data may include topology data, routing information, and the like. This may be done using the show commands, tracepath commands or in another way.

At 904, a detailed network topology is generated based on the network data. This may be generated as shown, for example in FIGS. 3-5. For example, the network topology may include a topology of all entities in the network and routing information related to the entities. For example, the network topology may be modeled as a graph where each node corresponds to an endpoint and each edge corresponds to a network link between endpoints. In some embodiments, the network topology may include observation points and subnets (e.g., IP addresses that correspond to workloads).

At 906, the network environment is divided into multiple administrative domains based on the network topology. An administrative domain (AD) is a logical segment in the network topology such that all observation points within it have the same network view. A network view can include all potentially reachable IP addresses from an observation point. For example, the network topology may be used to identify isolated sections (e.g., "islands") in the network environment.

Determining administrative domains may involve different steps for different types of networks. For example, in an environment involving NAT (e.g., NSX or the like), NAT information may be included in the network data, and may be used in determining administrative domains. In an AWS environment, VPCs may be created that include subnets. Each subnet with a VPC is unique, and any two VPCs can be peered if they do not include any overlapping subnets. As such, in the AWS environment, VPC and peer information may be used in determining administrative domains. For example, all subnets within a VPC may be assigned to the same administrative domain. Even though each subnet within a VPC may have a different network view (e.g., it may be peered with subnets of other VPCs), all subnets within a VPC may be included in the same administrative domain because peering rules guarantee that all subnets reachable from within the VPC will be non-overlapping (e.g., unique). In hybrid environments, VPN connection information (e.g., between VPCs and NSX Edges) may also be used in determining administrative domains and populating lookup tables for administrative domains. Other examples of determining administrative domains may include breaking a network environment into administrative domains such that each VNIC is in a separate administrative domain, choosing administrative domains such that all interfaces in a given L3 subnet are included in an administrative domain, and choosing administrative domains such that all subnets in a particular AWS VPC are included in a single administrative domain.

At 908, observation point mapping information is generated by mapping observation points to ADs based on the network topology. For example, observation point mapping information may comprise a table that maps each observation point in the network environment to an administrative domain (e.g., based on determinations made at 906).

At 910, a lookup table is generated for each administrative domain that maps IP subnets or IP addresses to administrative domains. For example, the lookup table for a given administrative domain may include each IP subnet that is potentially reachable from the given administrative domain, mapping each of these IP subnets to an administrative domain in which the IP subnet is located. For example, the network topology may be used to generate the lookup tables.

At 912, a workload identification table is generated that maps workloads to combinations of IP subnets (or IP addresses) and administrative domains. For example, the workload identification table may be generated based on the network topology and the administrative domain determinations at 906, and may include mappings of IP address and administrative domain pairs to workloads. The workload identification table may be used to uniquely identify a workload once the IP address and the administrative domain of the workload have been determined (e.g., based on a flow record, observation point mapping information, and at least one lookup table).

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer.

As described above, each virtual machine includes a guest operating system in which at least one application runs. These embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

At least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of determining a network topology in a hybrid cloud environment, the method comprising:
   receiving connection information from a local perimeter edge router of a local network that has a known topology, wherein the local network is part of a private cloud environment of the hybrid cloud environment;
   receiving connection information from a remote perimeter edge router of a remote network that is provided by a cloud provider in response to a show command to the remote perimeter edge router, wherein the remote network is part of a public cloud environment of the hybrid cloud environment and wherein information about vendor-specific connectivity mechanisms for the private cloud environment to communicate with the public cloud environment is not available in the received remote perimeter edge router connection information in response to the show command;
   associating the received local perimeter edge router connection information with the received remote perimeter edge router connection information such that at least one connection between the local network and the remote network is inferred by the associated connection information;
   normalizing the associated connection information to a generic model, the generic model representing connections having different link layer policies in a generic way; and
   applying the normalized connection information to a network topology of the local network and the remote network.

2. The method of claim 1, further comprising providing hooks in the generic model for at least one of the different link layer policies of the connection information.

3. The method of claim 2, wherein the hooks represent additional vendor-specific information of the respective different link layer policy.

4. The method of claim 1, wherein normalizing comprises creating a generic entity and a vendor-specific entity for at least one connection and wherein applying comprises applying the generic entity to the generic model and adding a reference to the vendor-specific entity to the generic model.

5. The method of claim 4, wherein the reference comprises a hook within the generic model for vendor-specific attributes of the respective vendor-specific entity.

6. The method of claim 1, wherein applying the normalized connection information comprises connecting network entities together using an analysis of the generic model with the applied normalized connection information.

7. The method of claim 1, wherein the received local connection information comprises a local routing configuration and local link layer information and wherein the received remote connection information comprises a remote routing configuration and remote link layer information.

8. The method of claim 7, wherein associating comprises associating a local public address of the received local routing configuration with a corresponding remote public address of the received remote routing configuration and associating a remote public address of the received local routing configuration with a corresponding local public address of the received remote routing configuration.

9. The method of claim 8, wherein the remote public address of the received remote routing configuration corresponds with the local public address of the received local routing configuration in that the remote public address and the local public address are the same address.

10. The method of claim 8, wherein associating further comprises associating a local Identifier (ID) of the received local routing configuration with a corresponding remote ID of the received remote routing configuration and associating a remote ID of the received local routing configuration with a corresponding local ID of the received remote routing configuration.

11. The method of claim 8, further comprising associating subnets of the received local routing configuration with the associated local public address.

12. The method of claim 8, wherein the local public address comprises a local border gateway protocol identifier and wherein the remote public address comprises a border gateway protocol neighbor identifier.

13. The method of claim 1, further comprising deriving a path between two routing entities of the network topology and testing the path with a path tracing command.

14. A non-transitory computer-readable storage medium containing program instructions for a method for determining a network topology, wherein execution of the program instructions by one or more processors of a computer causes the one or more processors to perform steps comprising:
receiving connection information from a local perimeter edge router of a local network that has a known topology, wherein the local network is part of a private cloud environment of the hybrid cloud environment;
receiving connection information from a remote perimeter edge router of a remote network that is provided by a cloud provider in response to a show command to the remote perimeter edge router, wherein the remote network is part of a public cloud environment of the hybrid cloud environment and wherein information about vendor-specific connectivity mechanisms for the private cloud environment to communicate with the public cloud environment is not available in the received remote perimeter edge router connection information in response to the show command;
associating the received local perimeter edge router connection information with the received remote perimeter edge router connection information such that at least one connection between the local network and the remote network is inferred by the associated connection information;
normalizing the associated connection information to a generic model, the generic model representing connections having different link layer policies in a generic way; and
applying the normalized connection information to a network topology of the local network and the remote network.

15. The method of claim 14, wherein normalizing comprises creating a generic entity and a vendor-specific entity for each connection and wherein applying comprises applying the generic entity to the generic model and adding a reference to the vendor-specific entity to the generic model.

16. The method of claim 14, applying the normalized connection information comprises connecting network entities together using an analysis of the generic model with the applied normalized connection information.

17. A system for determining a network topology in a hybrid cloud environment, the system comprising:
a memory; and
at least one processor configured to:
receive connection information from a local perimeter edge router of a local network that has a known topology, wherein the local network is part of a private cloud environment of the hybrid cloud environment;
receive connection information from a remote perimeter edge router of a remote network that is provided by a cloud provider in response to a show command to the remote perimeter edge router, wherein the remote network is part of a public cloud environment of the hybrid cloud environment and wherein information about vendor-specific connectivity mechanisms for the private cloud environment to communicate with the public cloud environment is not available in the received remote perimeter edge router connection information in response to the show command;
associate the received local perimeter edge router connection information with the received remote perimeter edge router connection information such that at least one connection between the local network and the remote network is inferred by the associated connection information;
normalize the associated connection information to a generic model, the generic model representing connections having different link layer policies in a generic way; and
apply the normalized connection information to a network topology of the local network and the remote network.

18. The system of claim 17, wherein the received local connection information comprises local routing configurations and local link layer information and wherein the received remote connection information comprises remote routing configurations and remote link layer information.

19. The system of claim 18, wherein the at least one processor is configured to associate a local public address of the received local routing configuration with a corresponding remote public address of the received remote routing configuration and associate a remote public address of the received local routing configuration with a corresponding local public address of the received remote routing configuration.

20. The system of claim 19, wherein the at least one processor is configured to associate a local Identifier (ID) of the received local routing configuration with a corresponding remote ID of the received remote routing configuration and associate a remote ID of the received local routing configuration with a corresponding local ID of the received remote routing configuration.

* * * * *